US012504351B2

(12) United States Patent
Basu et al.

(10) Patent No.: US 12,504,351 B2
(45) Date of Patent: Dec. 23, 2025

(54) MULTI-FUNCTION ROBOTIC ARM WITH MODULAR HUB FOR AUTOMATED INSPECTION AND MAINTENANCE OF AUTONOMOUS VEHICLES

(71) Applicant: GM Cruise Holdings LLC, San Francisco, CA (US)

(72) Inventors: Rajat Basu, Sunnyvale, CA (US); Samuel Glidden, Phoenix, AZ (US)

(73) Assignee: GM Cruise Holdings LLC, San Francisco, CA (US)

( * ) Notice: Subject to any disclaimer, the term of this patent is extended or adjusted under 35 U.S.C. 154(b) by 267 days.

(21) Appl. No.: 18/156,564

(22) Filed: Jan. 19, 2023

(65) Prior Publication Data

US 2024/0248004 A1 Jul. 25, 2024

(51) Int. Cl.
*G01M 17/007* (2006.01)
*B25J 9/16* (2006.01)
*B25J 15/00* (2006.01)

(52) U.S. Cl.
CPC ......... *G01M 17/007* (2013.01); *B25J 9/1692* (2013.01); *B25J 15/0061* (2013.01)

(58) Field of Classification Search
CPC .. G01M 17/007; B25J 9/1692; B25J 15/0061; B25J 5/007; B25J 19/023
See application file for complete search history.

(56) References Cited

U.S. PATENT DOCUMENTS

| 2019/0366544 A1* | 12/2019 | Oka | B25J 9/1666 |
| 2021/0206579 A1* | 7/2021 | Freitas | B25J 19/023 |
| 2021/0323173 A1* | 10/2021 | Foland | B25J 15/06 |

OTHER PUBLICATIONS

Rankin, Arturo, et al. "Integration of an Arm Kinematics Hot Patch Onboard the Curiosity Rover." 2021 IEEE Aerospace Conference (50100). IEEE, 2021. (Year: 2021).*
V. Verma and S. Kuhn, "Refactoring the Curiosity Rover's Sample Handling Architecture on Mars," 2019 IEEE Aerospace Conference, Big Sky, MT, USA, 2019, pp. 1-12, doi: 10.1109/AERO.2019. 8741988. keywords: {Instruments; Hardware;Computer architecture;Mars;Manipulators; Electron tubes}, (Year: 2019).*

* cited by examiner

*Primary Examiner* — Timothy P Graves
(74) *Attorney, Agent, or Firm* — Honigman LLP; Matthew H. Szalach; Jonathan P. O'Brien

(57) ABSTRACT

Systems and techniques are described for improving inspections of autonomous vehicles by utilizing a robotic arm with a modular hub that is configured to receive a plurality of peripherals for inspecting the autonomous vehicle. An example system can use a controller; a robotic arm; and a modular hub coupled to an end of the robotic arm to inspect an autonomous vehicle. The modular hub can include a plurality of ports for receiving a plurality of peripherals. Each port of the plurality of ports can be addressable, and each peripheral can be individually identified and controlled by the controller. In some cases, the system can include multiple modular hubs, with each modular hub configured to receive one or more peripherals for inspecting autonomous vehicles.

19 Claims, 7 Drawing Sheets

MULTI-FUNCTION ROBOTIC ARM WITH MODULAR HUB FOR AUTOMATED INSPECTION AND MAINTENANCE OF AUTONOMOUS VEHICLES

BACKGROUND

1. Technical Field

The present disclosure generally relates to autonomous vehicles and, more specifically, relates to a modular hub for use with a six-axis robotic arm to enable automated inspections of autonomous vehicles.

2. Introduction

An autonomous vehicle is a motorized vehicle that can navigate without a human driver. An exemplary autonomous vehicle can include various sensors, such as a camera sensor, a light detection and ranging (LIDAR) sensor, and a radio detection and ranging (RADAR) sensor, amongst others. The sensors collect data and measurements that the autonomous vehicle can use for operations such as navigation. The sensors can provide the data and measurements to an internal computing system of the autonomous vehicle, which can use the data and measurements to control a mechanical system of the autonomous vehicle, such as a vehicle propulsion system, a braking system, or a steering system. Autonomous vehicles may be utilized in a fleet to provide transportation services to various users. As such, repeated use of autonomous vehicles by different occupants requires autonomous vehicles to be in good working condition, clean, and ready to serve new occupants. Inspections of such autonomous vehicles, however, may be time consuming, inefficient, and lead to unnecessary down-time.

BRIEF DESCRIPTION OF THE DRAWINGS

The various advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which.

DETAILED DESCRIPTION

Figure 1:
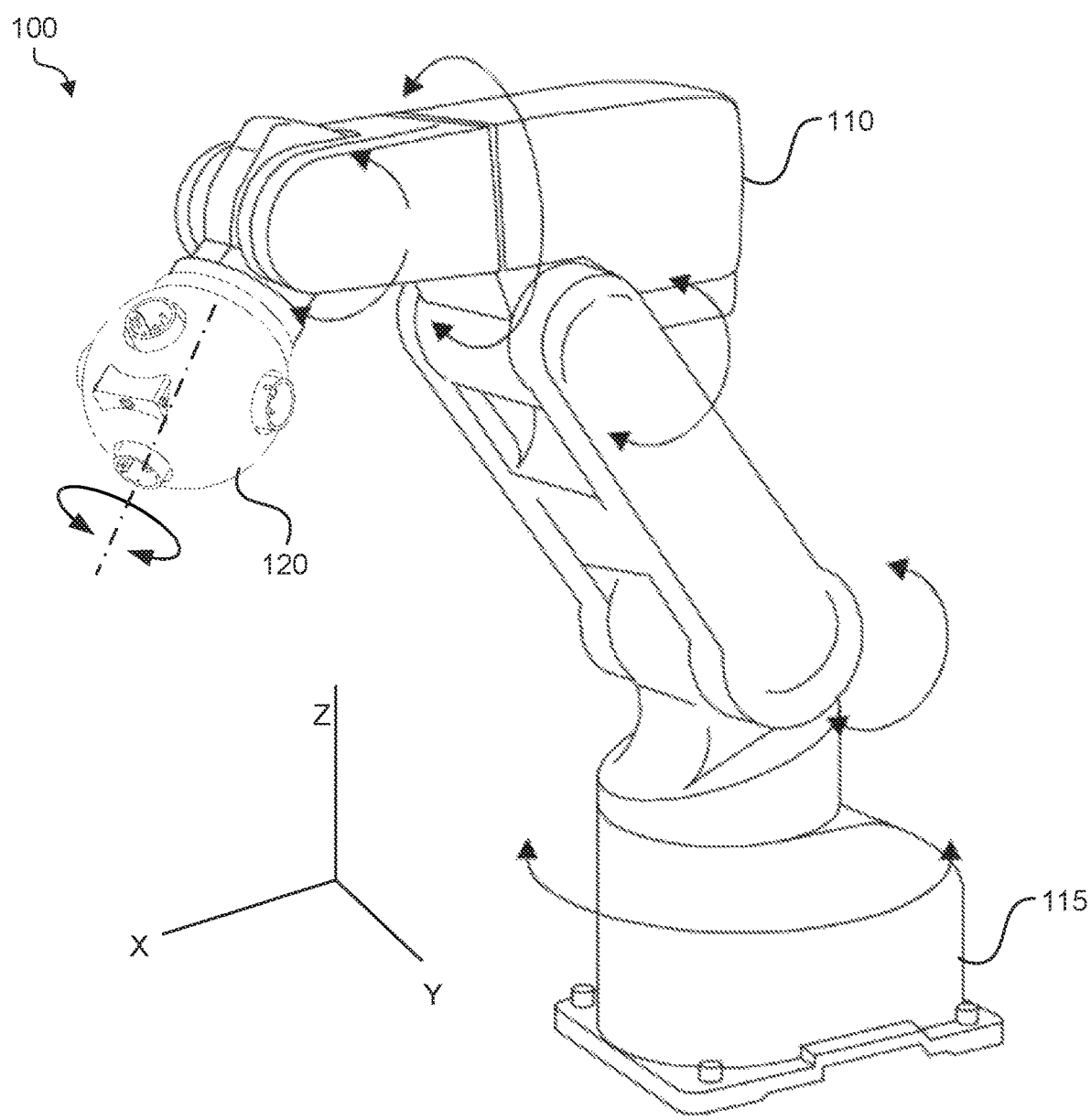
FIG. 1 illustrates a robotic arm assembly with a modular hub, according to some examples of the present disclosure.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.

One aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

An autonomous vehicle (AV) is a motorized vehicle that can navigate without a human driver. An exemplary AV can include various sensors, such as a camera sensor, a light detection and ranging (LIDAR) sensor, and a radio detection and ranging (RADAR) sensor, amongst others. The sensors collect data and measurements that the autonomous vehicle can use for operations such as navigation. The sensors can provide the data and measurements to an internal computing system of the AV, which can use the data and measurements to control a mechanical system of the AV, such as a vehicle propulsion system, a braking system, or a steering system. AVs may be utilized in a fleet to provide transportation services to various users. As such, repeated use of AVs by different occupants requires AVs to be in good working condition, clean, and ready to serve new occupants. Inspections of such AVs, however, may be time consuming, inefficient, and lead to unnecessary down-time.

The disclosed technology provides for an automated inspection system to efficiently inspect AVs by utilizing a multi-axis robotic arm with a modular hub that is configured to receive a variety of inspection sensors and tools in one of many ports provided in the hub. The modular hub is configured to receive multiple sensors and/or tools at once, and when connected, a controller coupled to the robotic arm is configured to control operation and movement of the connected sensors and tools. As will be discussed in further detail below, each sensor/tool has memory for storing an identifier that is used by the controller to control an operation and movement of the sensor/tool in order to carry out inspections of AVs. By utilizing a modular hub that is capable of accepting a multitude of different sensors and tools, inspections of AVs can be accomplished in an efficient and automated manner.

FIG. 1 illustrates a robotic arm assembly 100 with a modular hub, according to some examples of the present disclosure. The robotic arm assembly 100 utilizes a six-axis robotic arm 110 and a modular hub 120 attached to an end of the robotic arm 110. The robotic arm 110 is in communication with a controller (not shown) that may be located locally to the robotic arm assembly 100 or remotely. The controller is configured to control operation and movement of the robotic arm 110. As shown, the robotic arm 110 has six degrees of freedom along various joints. For example, starting from a base of the robotic arm 100, a first joint along a base of the robotic arm 110 may allow for rotation along a Z axis, a second joint may allow for rotation along a Y axis relative to the first joint, a third joint may provide additional rotation along a Y axis relative to the first joint, a fourth joint may allow for rotation along an X axis relative to the third joint, a fifth joint may allow for additional rotation along a Y axis relative to the fourth joint, and a sixth joint may allow for rotation along an X axis relative to the fifth joint.

In some examples, the robotic arm 110 can be connected/coupled to a base 115 of the robotic arm assembly 100. The base 115 can be configured to be attached/coupled to any location or placed on a floor. For example, the base 115 can be configured to be attached/coupled to a workbench, an AV, another tool, a structure or cart (e.g., mobile or immobile), a platform, and/or any other object. As another example, the base 115 can be placed on a floor and can be configured to hold the robotic arm assembly 100 in place and maintain a balance of the robotic arm assembly 100 (e.g., even when the robotic arm 110 is moved and/or repositioned) while the base 115 is placed on the floor. In some examples, the base 115 can hold the robotic arm assembly 100 in place and maintain a balance of the robotic arm assembly 100 (e.g., including the robotic arm 110) based on a center of gravity and weight of the base 115 relative any other portion of to the robotic arm assembly 100.

The modular hub 120 is configured to receive a plurality of peripherals, such as sensors and/or tools that are each configured to provide an inspection or maintenance operation in relation to readying an AV for occupancy. As such, the modular hub 120 includes a plurality of ports that are each configured to receive any one of the plurality of peripherals.

In some examples, the robotic arm assembly 100, the robotic arm 110, the modular hub 120, and/or an AV selected to receive maintenance operations and/or otherwise interact with the robotic arm assembly 100 can be positioned to align the robotic arm assembly 100, the robotic arm 110, the modular hub 120, and/or the AV as desired for a particular operation performed by the robotic arm assembly 100 on the AV. For example, the robotic arm assembly 100, the robotic arm 110, the modular hub 120, and/or an AV can be repositioned to align a tool or sensor with a particular location relative to the AV in order to perform a desired operation(s) on the AV. To illustrate, the robotic arm assembly 100, the robotic arm 110, the modular hub 120, and/or the AV can be repositioned to place the modular hub 120 and a camera sensor on the modular hub 120 under a portion of the AV to obtain image data depicting an area under the AV for analysis. As another example, the robotic arm assembly 100, the robotic arm 110, the modular hub 120, and/or the AV can be repositioned to align a diagnostics tool on the modular hub 120 with a port/receptacle on the AV in order to send probes to the AV and/or run a diagnostics test of the AV.

In some examples, the robotic arm 110 can be configured to any desired length. For example, the robotic arm 110 can be configured have a length that allows the robotic arm 110 to reach harder-to-reach areas of an AV (e.g., any type and/or size of AV) such as, for example and without limitation, areas under the AV, areas above the AV, areas inside a cabin of the AV, areas inside a trunk of the AV, areas where one or more electrical and/or mechanical systems of the AV are located, etc. In some cases, the robotic arm 110 can alternatively be configured to reduce its size and/or the space occupied by the robotic arm assembly 100 when in use and/or when not in use. In some examples, the robotic arm 110 can be a telescoping arm that allows the robotic arm 110 to be extended or retracted to increase or reduce the length of the robotic arm 110 as needed.

Figure 2:
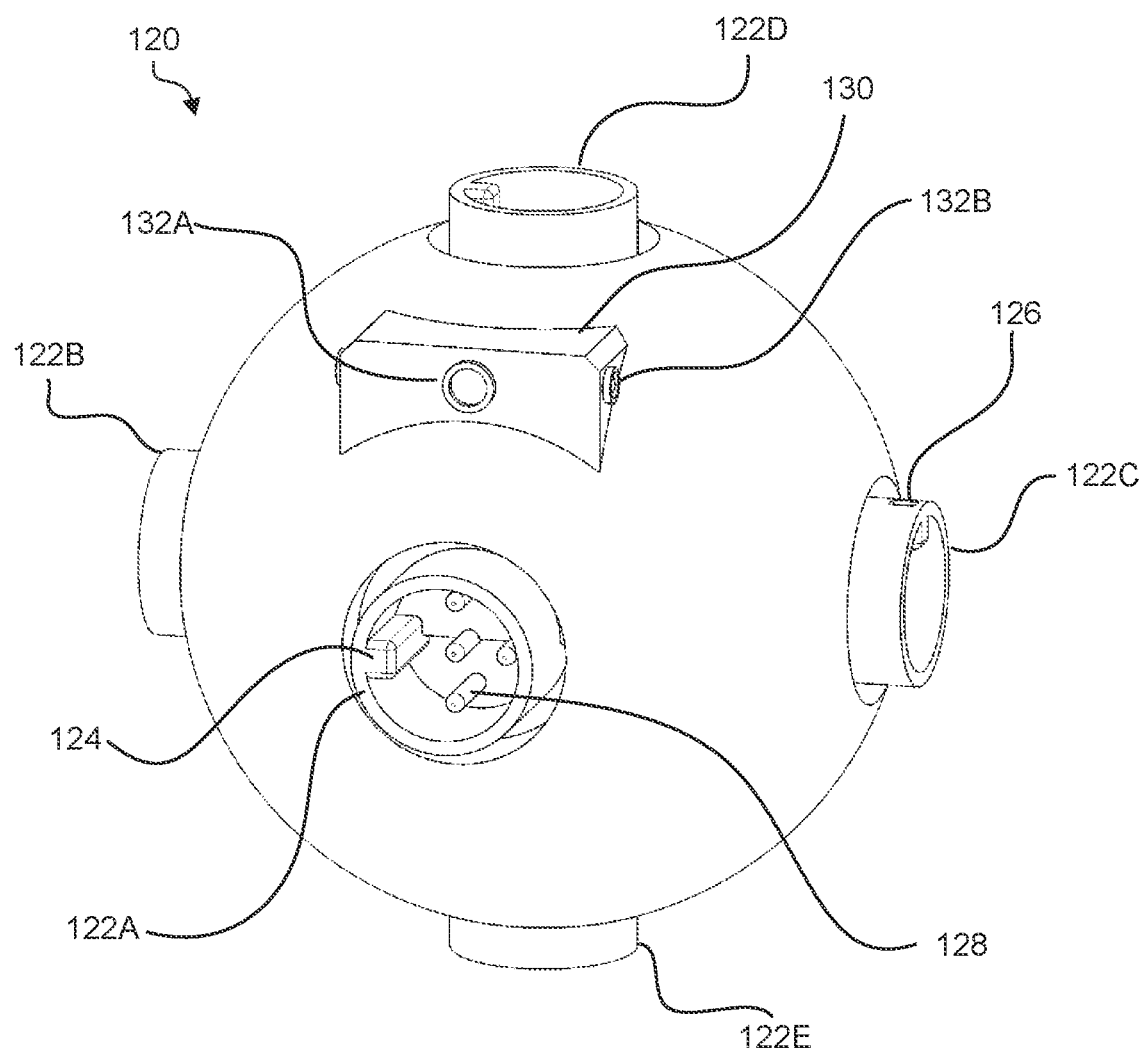
FIG. 2 illustrates a modular hub for use in automated inspections of autonomous vehicles, according to some examples of the present disclosure.

FIG. 2 illustrates the modular hub 120 for use in automated inspections of autonomous vehicles, according to some examples of the present disclosure. The modular hub 120 is configured to receive a variety of sensors and/or tools that are configured to inspect an AV and/or perform maintenance operations on the AV. The modular hub 120 and may have a form factor that enables simultaneous attachment and operation of a multitude of sensors and/or tools. In one example, the modular hub 120 may have a spherical form factor with the plurality of ports arranged along various quadrants of the modular hub 120. In another example, the modular hub 120 may have a rectangular, cuboid, or other form factor that enables the attachment of multiple peripherals at the same time.

The modular hub 120 has a plurality of ports 122A-E that are each configured to receive a plurality of peripherals (e.g., tools, sensors, etc.). Each port 122A-E includes power and data connectors 128 that are configured to provide power to and communicate with connected peripherals. In some examples, each port 122A-E can include a key 124 to ensure peripherals are connected to the modular hub 120 in the correct orientation. In some examples, each port 122A-E can include a locking recess 126 to mechanically retain any connected peripherals and prevent inadvertent disconnection.

In one aspect, each port 122A-E is addressable by the controller. In other words, each port can receive individual instructions from the controller to control operations of connected peripherals. In some cases, the location of each port 122A-E with respect to the modular hub 120 can be identified by the controller to enable the controller to precisely know where each port 122A-E is located with respect to the modular hub 120, and by extension, where each port 122A-E is located in three-dimensional space.

The modular hub 120 may also include a camera array 130 having a plurality of cameras 132A, 132B mounted thereon. Each camera 132A, 132B may be positioned on the camera array 130 such that each camera 132A, 132B has a different field of view. For example, camera 132A may face forward and camera 132B may be positioned orthogonal to camera 132A. Image data captured by the camera array 130 may be processed by the controller to confirm a location of connected peripherals with respect to the robotic arm assembly 100, robotic arm 110, modular hub 120, users within a proximity to the robotic arm assembly 100, and/or an AV.

In some aspects, the modular hub 120 may utilize additional sensors to aid the controller in confirming a position of connected peripherals with respect to the robotic arm assembly 100, robotic arm 110, modular hub 120, and/or AV. For example, an inertial measurement unit (IMU) may be mounted within the sensor array 130 or within a housing of the modular hub 120. Data provided by the IMU may be processed by the controller to confirm a location and/or orientation of connected peripherals with respect to the robotic arm assembly 100, robotic arm 110, modular hub 120, and/or AV. In another example, the modular hub 120 may include a proximity sensor that is configured to detect the presence of an object or person in vicinity to the modular hub 120 and/or robotic arm 110. In this example, data provided by the proximity sensor may be provided to the controller to detect a human in proximity to the robotic arm 110, modular hub 120, and/or connected peripherals.

In some cases, the modular hub 120 can include one or more network/communications interfaces for sending and/or receiving data. For example, the modular hub 120 can include one or more wires and/or wireless network interfaces for sending and/or receiving data communications (e.g., wired and/or wireless). To illustrate, the modular hub 120 can include a communications system configured to exchange information remotely over a network, such as through an antenna array or interface that can provide a WIFI network connection, a mobile or cellular network connection (e.g., Third Generation (3G), Fourth Generation (4G), Long-Term Evolution (LTE), 5th Generation (5G), etc.), and/or other wireless network connection (e.g., License Assisted Access (LAA), Citizens Broadband Radio Service (CBRS), MULTEFIRE, etc.), a wired network connection (e.g., Ethernet, Universal Serial Bus (USB), etc.). In some examples, such communications system can additionally or alternatively facilitate the local exchange of information, such as through a wired connection and/or a local wireless connection (e.g., Wireless Local Area Network (WLAN), Bluetooth®, infrared, etc.).

Figure 3:
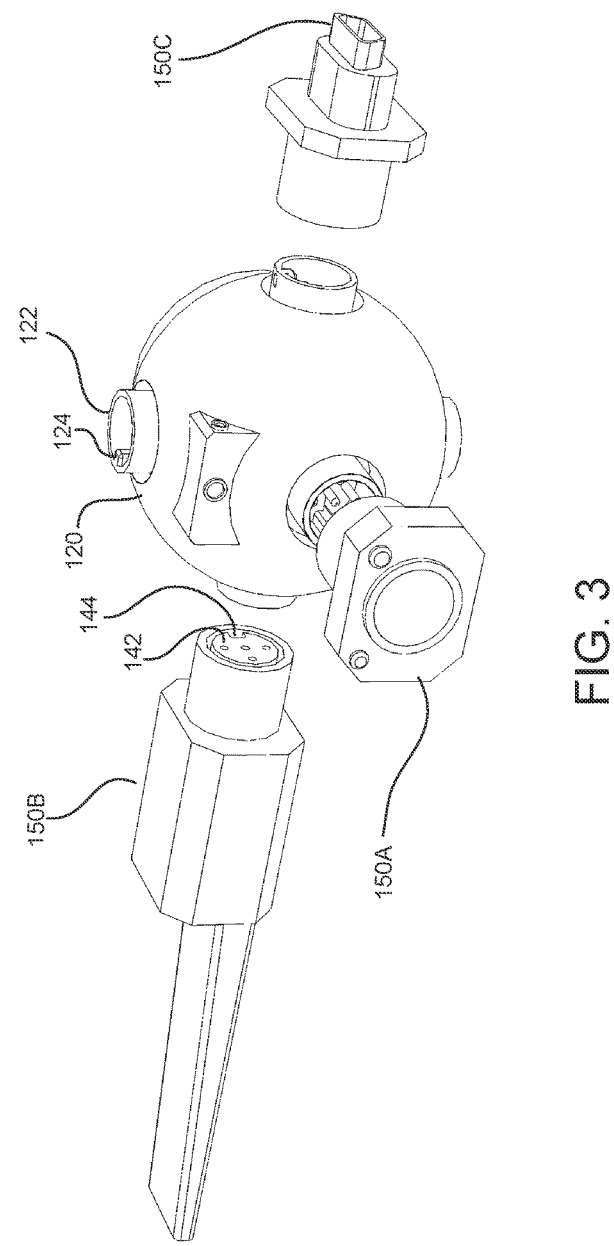
FIG. 3 illustrates a modular hub and peripherals for use in automated inspections of autonomous vehicles, according to some examples of the present disclosure.

FIG. 3 illustrates a modular hub 120 and peripherals 150A-C for use in automated inspections of autonomous vehicles, according to some examples of the present disclosure. Each peripheral 150A-C has a receptacle 142 for connecting to any port 122 on the modular hub 120. As such, peripherals 150A-C may be connected to any one of ports 122A-E (as shown in FIG. 2). Each receptacle 142 includes a channel 144 to receive key 124 to enable proper orientation of peripherals 150A-C with respect to ports 122. Receptacles 142 are configured to couple to ports 122 to receive power and to communicate with controller.

The peripherals 150A-C may include a camera to capture image data, an electronic nose to detect scents, a proximity sensor to detect objects or persons, a probe for receiving diagnostic information from the autonomous vehicle (such as from an onboard diagnostics "ODB" port), a USB test probe to test USB ports, a vacuum to remove debris, a motorized brush to agitate or remove debris, a cleaning head to clean sensors on the AV, or other sensors or tools that may be useful inspecting or maintaining an AV as would be understood by a person of ordinary skill in the art.

As shown in FIG. 3, a first peripheral 150A may be a camera, a second peripheral 150B may be a vacuum, and a third peripheral 150C may be a data probe configured to connect to an ODB port. The peripherals 150A-C may be simultaneously connected to the modular hub 120 and used in conjunction with one another as desired to enable effective inspection and maintenance of the AV. For example, the camera may capture image data relating to a condition of an interior of the AV. Image data may be processed to identify debris and thereafter, the vacuum may be activated to remove the debris while the camera is used to monitor debris removal. Once adequately cleaned, the camera may capture additional image data to confirm removal of the debris. In another example, the probe may be connected to the ODB port to receive diagnostic codes from the AV. The codes may be processed to diagnose a failure, such as an inoperable seatbelt, and the camera may be used to visually inspect the condition of the seatbelt. By utilizing a multitude of sensors and tools on the modular hub 120, a variety of inspection and maintenance functions may be performed either simultaneously or sequentially in a timely and efficient manner to thereby enable faster redeployment of the AV for transportation service.

In operation, each peripheral 150 is assigned an identifier that is provided to the controller once the peripheral 150 is connected to a port 122. The identifier is used by the controller to identify the type of peripheral 150 connected to the modular hub 120 (e.g., camera, vacuum, probe, brush, etc.). Once the type of peripheral is identified, the controller loads the appropriate software module to control and operate the connected peripheral as desired. As such, each connected peripheral is individually identified and controlled by the controller.

The controller can be configured to determine an XYZ location of each connected peripheral 150 in three-dimensional space. For example, each peripheral 150 can have particular dimensions (e.g., length, width, height) associated to it. The dimensions can be identified by the controller via the identifier provided by each connected peripheral. Once a peripheral is identified as being connected to a particular port 122 on the modular hub 120, dimensional data of the peripheral 150 may be used, along with the port 122 location, to calculate an XYZ position of the connected peripheral 150. For example, the vacuum tool may be assigned an identifier corresponding to a vacuum. Once connected to port 122B, the controller reads the identifier stored in the vacuum and identifies the connected peripheral in port 122B as being a vacuum. The controller then loads a software module corresponding to operating the vacuum into memory. In addition, because each port is addressable, the controller is able to identify which port 122 of the plurality of ports the vacuum is coupled to. In this example, the vacuum is connected to port 122B, therefore data received from port 122B informs the controller of the location of the vacuum with respect to modular hub 120. The controller also performs a lookup function and retrieves dimensional data associated with the vacuum and uses the dimensional data, along with the port location on the modular hub 120, to calculate an XYZ position of the vacuum with respect to the robotic arm and/or modular hub.

In some aspects, the controller may be configured to generate a recommendation for identifying which port of the plurality of ports 122 to connect a peripheral 150. For example, the controller may be configured to perform routine inspection or maintenance operations, such as interior refreshing or debris removal. In such instances, the controller may generate a desired configuration of sensor and tool combinations, along with corresponding ports 122 to connect into, to enable efficient completion of inspection and maintenance tasks by minimizing sensor and/or tool changes/swaps. In this example, the controller may suggest that a camera be coupled to port 122A and a vacuum be coupled to port 122E to enable removal of debris. In addition, the controller may suggest an electronic nose be coupled to port 122D and an air freshener be coupled to port 122C to enable refreshing of the interior of the AV.

Figure 4:
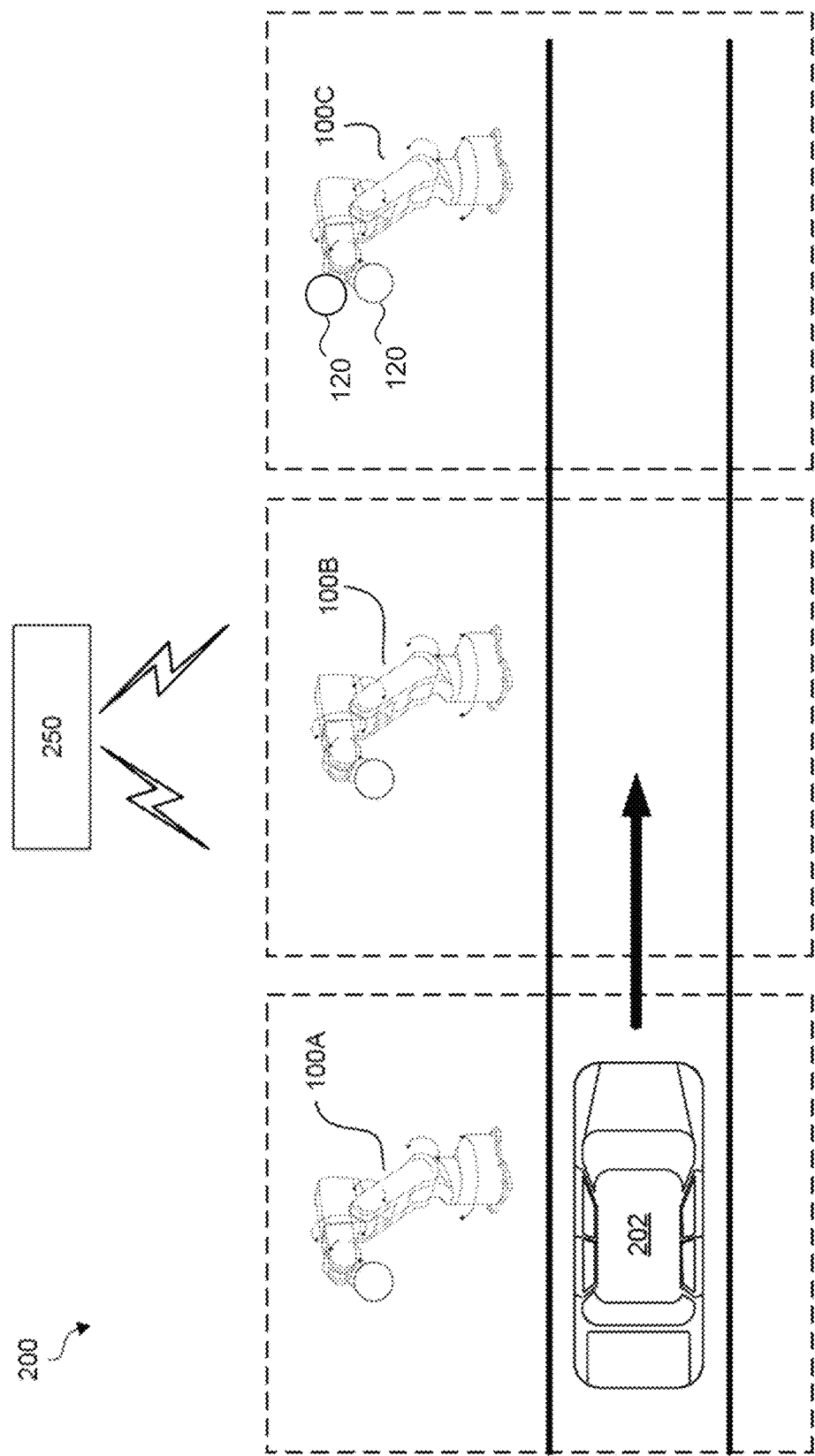
FIG. 4 illustrates an example system for automated inspections of autonomous vehicles, according to some examples of the present disclosure.

FIG. 4 illustrates an example system 200 for automated inspections of autonomous vehicles, according to some examples of the present disclosure. The AV 202 can navigate roadways without a human driver based on sensor signals generated by multiple sensor systems that may include IMUs, cameras (e.g., still image cameras, video cameras, etc.), light sensors (e.g., LIDAR systems, ambient light sensors, infrared sensors, etc.), RADAR systems, GPS receivers, audio sensors (e.g., microphones, Sound Navigation and Ranging (SONAR) systems, ultrasonic sensors, etc.), engine sensors, speedometers, tachometers, odometers, altimeters, tilt sensors, impact sensors, airbag sensors, seat occupancy sensors, open/closed door sensors, tire pressure sensors, rain sensors, and so forth.

The system 200 utilizes a plurality of robotic arm assemblies 100A-C that are each configured to perform different inspection and/or maintenance routines as the AV 202 moves from a first robotic arm assembly 100A to a second robotic arm assembly 100B, and to a third robotic arm assembly 100C. For example, the first robotic arm assembly 100A may be configured to visually inspect the interior and exterior of the AV. The visual data captured by the first robotic arm assembly 100A may be processed to identify areas needing cleaning and such identified areas are provided to the second robotic arm assembly 100B. The second robotic arm assembly 100B may be configured to perform cleaning routines via the use of vacuums and brushes. In response to receiving the areas identified for cleaning from the first robotic arm assembly 100A, the second robotic arm assembly 100B moves the cleaning tools into position and performs the cleaning routine. In addition, the second robotic arm assembly 100B may be equipped with an electronic nose and data from the electronic noise may be processed to determine whether the cleaning operations have resulted in a reading that satisfies acceptable thresholds. If readings indicate soiled interiors, the AV 202 may move to the third robotic arm assembly 100C for a deep cleaning operation where detergents and brushes may be used to clean soiled areas. In this example, as the AV 202 traverses autonomously through the robotic arm assemblies 100A-C, each subsequent robotic arm assembly 100A-C performs tasks that are informed by prior robotic arm assemblies, thereby resulting in the efficient performance of inspection and maintenance operations. As shown at the third robotic arm 100C, a set of modular hubs 120 may be coupled to the robotic arm.

The robotic arm assemblies 100A-C may be in communication with a data center 250. The data center 250 can include a private cloud (e.g., an enterprise network, a co-location provider network, etc.), a public cloud (e.g., an Infrastructure as a Service (IaaS) network, a Platform as a Service (PaaS) network, a Software as a Service (SaaS) network, or other Cloud Service Provider (CSP) network), a hybrid cloud, a multi-cloud, and/or any other network. The data center 250 can include one or more computing devices remote to the robotic arm assemblies 100A-C for managing a fleet of AVs and AV-related services, as well as managing inspection routines to be carried out by the robotic arm assemblies 100A-C. For example, in addition to managing the AV 202, the data center 250 may also provide robotic arm assemblies 100A-C with threshold criteria for determining whether an AV 202 should pass or fail an inspection, software updates for operating various peripherals, and routines for performing particular inspection and/or maintenance operations.

The data center 250 can send and receive various signals to and from the AV 202 and the robotic arm assemblies 100A-C. These signals can include sensor data captured by the robotic arm assemblies 100A-C, as well as sensor data captured by the AV 202. In another aspect, the AV 202 may communicate directly with the robotic arm assemblies 100A-C to provide sensor data captured by the AV 202 to the robotic arm assemblies 100A-C. Such data may be useful to the controller of the robotic arm assemblies 100A-C to identify areas or components that may have failed or that may have been diagnosed as problematic by the AV 202. In this example, the robotic arm assemblies 100A-C may capture image data to confirm an operating condition of components of the AV 202, such as an operating condition of a tire, seatbelt, or other AV component.

In another example, the robotic arm assemblies 100A-C may receive environmental data that is indicative of an environmental condition of the AV 202. The environmental data may then be used by the controller to alter operation of a connected peripheral based on an environmental condition of the autonomous vehicle. For example, if environmental data indicates that there are snow conditions in which the AV 202 is operating, the controller may increase an operating time for a motorized brush attached to a port of the modular hub to improve removal of salt or ice from interior upholstery.

The robotic arm assemblies 100A-C, AV 202, and the data center 250 may communicate with one another over one or more networks (not shown), such as a public network (e.g., the Internet, an Infrastructure as a Service (IaaS) network, a Platform as a Service (PaaS) network, a Software as a Service (SaaS) network, other Cloud Service Provider (CSP) network, etc.), a private network (e.g., a Local Area Network (LAN), a private cloud, a Virtual Private Network (VPN), etc.), and/or a hybrid network (e.g., a multi-cloud or hybrid cloud network, etc.). Communication between the robotic arm assemblies 100A-C and the AV 202 may be provided by a WIFI network connection, a mobile or cellular network connection (e.g., Third Generation (3G), Fourth Generation (4G), Long-Term Evolution (LTE), 5th Generation (5G), etc.), and/or other wireless network connection (e.g., License Assisted Access (LAA), Citizens Broadband Radio Service (CBRS), MULTEFIRE, etc.). Data may also be exchanged through a wired connection (e.g., via Universal Serial Bus (USB), etc.).

In one aspect, the controllers for the robotic arm assemblies 100A-C are configured to communicate with the remote data center 250. Data received from the remote data center 250 may relate to threshold criteria used to determine whether the AV 202 passes inspection. For example, the remote data center 250 may provide threshold criteria for unacceptable scent readings, unacceptable interior conditions, image characteristics indicative of failed or worn components, and/or image characteristics otherwise indicative of subpar operating standards. In some aspects, such threshold criteria may be derived through the use of machine-learning based classification techniques. For example, machine-learning classification schemes may include one or more of the following, alone or in combination: hidden Markov models; RNNs; CNNs; deep learning; Bayesian symbolic methods; Generative Adversarial Networks (GANs); support vector machines; image registration methods; and applicable rule-based systems. Where regression algorithms are used, they may include but are not limited to: a Stochastic Gradient Descent Regressor, a Passive Aggressive Regressor, etc.

Machine learning classification models can also be based on clustering algorithms (e.g., a Mini-batch K-means clustering algorithm), a recommendation algorithm (e.g., a Minwise Hashing algorithm, or Euclidean Locality-Sensitive Hashing (LSH) algorithm), and/or an anomaly detection algorithm, such as a local outlier factor. Additionally, machine-learning models can employ a dimensionality reduction approach, such as, one or more of: a Mini-batch Dictionary Learning algorithm, an incremental Principal Component Analysis (PCA) algorithm, a Latent Dirichlet Allocation algorithm, and/or a Mini-batch K-means algorithm, etc.

Figure 5:
FIG. 5 illustrates an example method for automating inspections of autonomous vehicles using a robotic arm and modular hub, according to some aspects of the disclosed technology.

FIG. 5 illustrates an example method 300 for automating inspections of autonomous vehicles using a robotic arm and modular hub, according to some aspects of the disclosed technology. At block 310, the method 300 can include receiving an identifier and XYZ data (e.g., XYZ coordinates) from a first peripheral connected to a first port of a modular hub. For example, a controller of an inspection system that includes the modular hub can receive the identifier and XYZ data from the first peripheral, which the controller can use to identify, locate/localize, control, and/or manage the first peripheral. The modular hub can be coupled to an end of a robotic arm as discussed above with reference to FIGS. 1-2. The first peripheral can include, for example and without limitation, a camera, an electronic nose, a proximity sensor, a tire tread scanner, and/or a probe for connecting to on-board diagnostic ports.

At block 320, the method 300 can include receiving an identifier and XYZ data (e.g., XYZ coordinates) from a second peripheral connected to a second port of the modular hub. For example, a controller of an inspection system that includes the modular hub can receive the identifier and XYZ data from the second peripheral, which the controller can use to identify, locate/localize, control, and/or manage the first peripheral. The second peripheral may include a vacuum, a brush, a sensor, a tire tread scanner, and/or a cleaning head. The first port and the second port may be configured to provide power to and/or communicate with the first and second peripherals, respectively. In some aspects, the method 300 can include loading a first software component/service to operate the first peripheral based on the identifier of the first peripheral, and/or loading a second software component/service to operate the second peripheral based on the identifier of the second peripheral.

At block 330, the method 300 can include calculating a first XYZ position of the first peripheral with respect to a base of a robotic arm based on the location of the first port and the XYZ data from the first peripheral. At block 340, the method 300 can include calculating a second XYZ position of the second peripheral with respect to the base of the robotic arm based on the location of the second port and the XYZ data from the second peripheral.

At block 350, the method 300 can include moving the first peripheral into proximity with an autonomous vehicle using the first XYZ position. At block 360, the method 300 can include inspecting the autonomous vehicle by controlling the first peripheral (e.g., via a controller). At block 370, the method 300 can include moving the second peripheral into proximity with the autonomous vehicle using the second XYZ position. At block 380, the method 300 can include inspecting the autonomous vehicle by controlling the second peripheral (e.g., via a controller).

In some aspects, the method 300 may further include receiving image data from a plurality of cameras mounted to the modular hub; and confirming a location of the first and second peripherals using the image data. The method 300 may also include communicating with a remote data center (and/or any remote system and/or device); receiving threshold criteria from the remote data center relating to inspection requirements; and comparing data received from the first or second peripherals to the threshold criteria to determine whether the autonomous vehicle passes inspection.

In some aspects, the method 300 may include communicating with the autonomous vehicle; receiving diagnostic data from the autonomous vehicle; and generating instructions to control the first or second peripheral based on the received diagnostic data. The method 300 may also include receiving environmental data relating to an environmental condition of the autonomous vehicle; and generating instructions to control the first or second peripheral based on the received environmental data.

The method 300 improves the effectiveness and efficiency of conducting inspection and maintenance operations on an AV by automating inspection and maintenance routines using a robotic arm and a modular hub that is configured to receive a multitude of interchangeable sensors and tools for inspecting and maintaining an AV.

In some examples, the robotic arm from block 330 can be coupled to a set of modular hubs. The set of modular hubs can include the modular hub from block 310 and one or more additional modular hubs. Moreover, each of the one or more additional modular hubs can include one or more ports for receiving one or more peripherals. In some cases, each modular hub can be configured to report a state of health (e.g., an error or error state, a healthy and/or functioning state, a failure and/or malfunctioning state, etc.) of that modular hub to a computing device such as, for example, a controller(s) and/or a processor(s) associated with the robotic arm and the set of modular hubs.

For example, each modular hub can be configured to report a state of health of that modular hub to a controller configured to control that modular hub (and/or the set of modular hubs). In some cases, the controller can be configured to detect an error and/or a failure of a particular modular hub from the set of modular hubs and, in response to detecting the error and/or the failure, generating a routing recommendation identifying one or more additional modular hubs from the set of modular hub that the autonomous vehicle can use to perform or complete an inspection of the autonomous vehicle.

In some examples, the controller can be configured to determine that an inspection capability from a set of inspection capabilities needed to perform a particular inspection of an autonomous vehicle is not supported by the modular hub; based on the inspection capability not being supported by the modular hub, identify at least one modular hub from the set of modular hubs that supports the inspection capability; and generate a recommendation that routes the autonomous vehicle to the at least one modular hub for a portion of the particular inspection involving the inspection capability. In some examples, the recommendation can indicate that the at least one modular hub supports the inspection capability.

Figure 6:
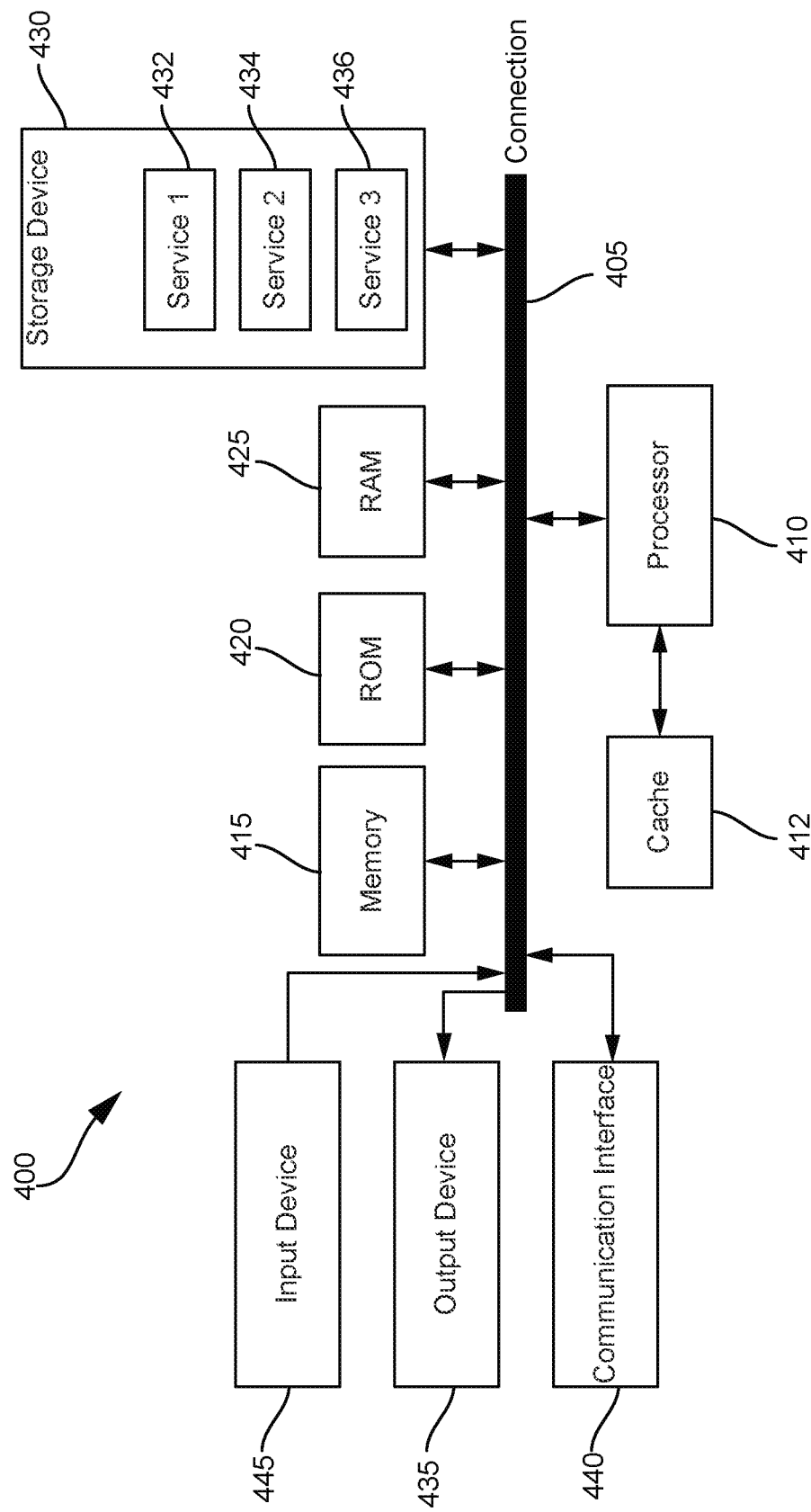
FIG. 6 illustrates an example processor-based system architecture for implementing certain aspects described herein.

FIG. 6 illustrates an example processor-based system architecture for implementing certain aspects described herein. For example, processor-based system 400 can be any computing device making up, or any component thereof in which the components of the system are in communication with each other using connection 405. Connection 405 can be a physical connection via a bus, or a direct connection into processor 410, such as in a chipset architecture. Connection 405 can also be a virtual connection, networked connection, or logical connection.

In some embodiments, computing system 400 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 400 includes at least one processing unit (Central Processing Unit (CPU) or processor) 410 and connection 405 that couples various system components including system memory 415, such as Read-Only Memory (ROM) 420 and Random-Access Memory (RAM) 425 to processor 410. Computing system 400 can include a cache of high-speed memory 412 connected directly with, in close proximity to, or integrated as part of processor 410.

Processor 410 can include any general-purpose processor and a hardware service or software service, such as services 432, 434, and 436 stored in storage device 430, configured to control processor 410 as well as a special-purpose processor where software instructions are incorporated into the actual processor design. Processor 410 may essentially be a completely self-contained computing system, containing multiple cores or processors, a bus, memory controller, cache, etc. A multi-core processor may be symmetric or asymmetric.

To enable user interaction, computing system 400 includes an input device 445, which can represent any number of input mechanisms, such as a microphone for speech, a touch-sensitive screen for gesture or graphical input, keyboard, mouse, motion input, speech, etc. Computing system 400 can also include output device 435, which can be one or more of a number of output mechanisms known to those of skill in the art. In some instances, multimodal systems can enable a user to provide multiple types of input/output to communicate with computing system 400. Computing system 400 can include communications interface 440, which can generally govern and manage the user input and system output. The communication interface may perform or facilitate receipt and/or transmission wired or wireless communications via wired and/or wireless transceivers, including those making use of an audio jack/plug, a microphone jack/plug, a Universal Serial Bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a Radio-Frequency Identification (RFID) wireless signal transfer, Near-Field Communications (NFC) wireless signal transfer, Dedicated Short Range Communication (DSRC) wireless signal transfer, 802.11 Wi-Fi® wireless signal transfer, Wireless Local Area Network (WLAN) signal transfer, Visible Light Communication (VLC) signal transfer, Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer signal transfer, ultraviolet light signal transfer, wireless signal transfer along the electromagnetic spectrum, or some combination thereof.

Communication interface 440 may also include one or more Global Navigation Satellite System (GNSS) receivers or transceivers that are used to determine a location of the computing system 400 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 430 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a Compact Disc (CD) Read Only Memory (CD-ROM) optical disc, a rewritable CD optical disc, a Digital Video Disk (DVD) optical disc, a Blu-ray Disc (BD) optical disc, a holographic optical disk, another optical medium, a Secure Digital (SD) card, a micro SD (microSD) card, a Memory Stick® card, a smartcard chip, a EMV chip, a Subscriber Identity Module (SIM) card, a mini/micro/nano/pico SIM card, another Integrated Circuit (IC) chip/card, Random-Access Memory (RAM), Atatic RAM (SRAM), Dynamic RAM (DRAM), Read-Only Memory (ROM), Programmable ROM (PROM), Erasable PROM (EPROM), Electrically Erasable PROM (EEPROM), flash EPROM (FLASHEPROM), cache memory (L1/L2/L3/L4/L5/L #), Resistive RAM (RRAM/ReRAM), Phase Change Memory (PCM), Spin Transfer Torque RAM (STT-RAM), another memory chip or cartridge, and/or a combination thereof.

Storage device 430 can include software services, servers, services, etc., that when the code that defines such software is executed by the processor 410, it causes the system 400 to perform a function. In some embodiments, a hardware service that performs a particular function can include the software component stored in a computer-readable medium in connection with the necessary hardware components, such as processor 410, connection 405, output device 435, etc., to carry out the function.

Figure 7:
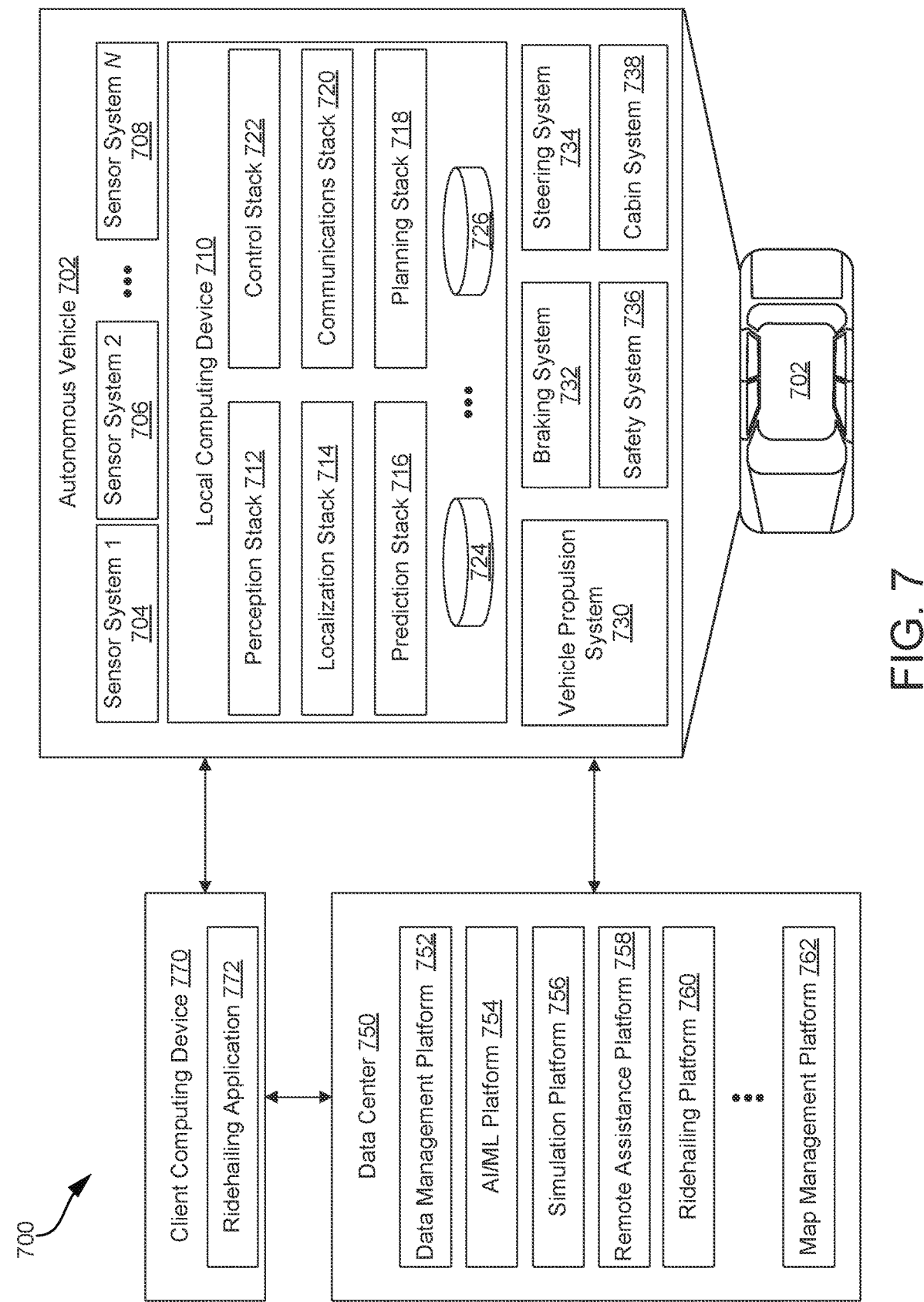
FIG. 7 illustrates an example system environment that can be used to facilitate autonomous navigation and routing operations, according to some examples of the present disclosure.

FIG. 7 is a diagram illustrating an example autonomous vehicle (AV) environment 700, according to some examples of the present disclosure. One of ordinary skill in the art will understand that, for the AV environment 700 and any system discussed in the present disclosure, there can be additional or fewer components in similar or alternative configurations. The illustrations and examples provided in the present disclosure are for conciseness and clarity. Other examples may include different numbers and/or types of elements, but one of ordinary skill the art will appreciate that such variations do not depart from the scope of the present disclosure.

In this example, the AV environment 700 includes an AV 702, a data center 750, and a client computing device 770. The AV 702, the data center 750, and the client computing device 770 can communicate with one another over one or more networks (not shown), such as a public network (e.g., the Internet, an Infrastructure as a Service (IaaS) network, a Platform as a Service (PaaS) network, a Software as a Service (SaaS) network, other Cloud Service Provider (CSP) network, etc.), a private network (e.g., a Local Area Network (LAN), a private cloud, a Virtual Private Network (VPN), etc.), and/or a hybrid network (e.g., a multi-cloud or hybrid cloud network, etc.).

The AV 702 can navigate roadways without a human driver based on sensor signals generated by sensor systems 704, 706, and 708. The sensor systems 704-708 can include one or more types of sensors and can be arranged about the AV 702. For instance, the sensor systems 704-708 can include one or more inertial measurement units (IMUs), camera sensors (e.g., still image camera sensors, video camera sensors, etc.), light sensors (e.g., LIDARs, ambient light sensors, infrared sensors, etc.), RADAR systems, GPS receivers, audio sensors (e.g., microphones, Sound Navigation and Ranging (SONAR) systems, ultrasonic sensors, etc.), engine sensors, speedometers, tachometers, odometers, altimeters, tilt sensors, impact sensors, airbag sensors, time-of-flight (TOF) sensors, seat occupancy sensors, open/closed door sensors, tire pressure sensors, rain sensors, and so forth. For example, the sensor system 704 can include a camera system, the sensor system 706 can include a LIDAR system, and the sensor system 708 can include a RADAR system. Other examples may include any other number and type of sensors.

The AV 702 can include several mechanical systems that can be used to maneuver or operate the AV 702. For instance, the mechanical systems can include a vehicle propulsion system 730, a braking system 732, a steering system 734, a safety system 736, and a cabin system 738, among other systems. The vehicle propulsion system 730 can include an electric motor, an internal combustion engine, or both. The braking system 732 can include an engine brake, brake pads, actuators, and/or any other suitable componentry configured to assist in decelerating the AV 702. The steering system 734 can include suitable componentry configured to control the direction of movement of the AV 702 during navigation. The safety system 736 can include lights and signal indicators, a parking brake, airbags, and so forth. The cabin system 738 can include cabin temperature control systems, in-cabin entertainment systems, and so forth. In some examples, the AV 702 might not include human driver actuators (e.g., steering wheel, handbrake, foot brake pedal, foot accelerator pedal, turn signal lever, window wipers, etc.) for controlling the AV 702. Instead, the cabin system 738 can include one or more client interfaces (e.g., Graphical User Interfaces (GUIs), Voice User Interfaces (VUIs), etc.) for controlling certain aspects of the mechanical systems 730-738.

The AV 702 can include a local computing device 710 that is in communication with the sensor systems 704-708, the mechanical systems 730-738, the data center 750, and/or the client computing device 770, among other systems. The local computing device 710 can include one or more processors and memory, including instructions that can be executed by the one or more processors. The instructions can make up one or more software stacks or components responsible for controlling the AV 702; communicating with the data center 750, the client computing device 770, and other systems; receiving inputs from riders, passengers, and other entities within the AV's environment; logging metrics collected by the sensor systems 704-708; and so forth. In this example, the local computing device 710 includes a perception stack 712, a mapping and localization stack 714, a prediction stack 716, a planning stack 718, a communications stack 720, a control stack 722, an AV operational database 724, and an HD geospatial database 726, among other stacks and systems.

The perception stack 712 can enable the AV 702 to "see" (e.g., via cameras, LIDAR sensors, infrared sensors, etc.), "hear" (e.g., via microphones, ultrasonic sensors, RADAR, etc.), and "feel" (e.g., pressure sensors, force sensors, impact sensors, etc.) its environment using information from the sensor systems 704-708, the mapping and localization stack 714, the HD geospatial database 726, other components of the AV, and/or other data sources (e.g., the data center 750, the client computing device 770, third party data sources, etc.). The perception stack 712 can detect and classify objects and determine their current locations, speeds, directions, and the like. In addition, the perception stack 712 can determine the free space around the AV 702 (e.g., to maintain a safe distance from other objects, change lanes, park the AV, etc.). The perception stack 712 can identify environmental uncertainties, such as where to look for moving objects, flag areas that may be obscured or blocked from view, and so forth. In some examples, an output of the prediction stack can be a bounding area around a perceived object that can be associated with a semantic label that identifies the type of object that is within the bounding area, the kinematic of the object (information about its movement), a tracked path of the object, and a description of the pose of the object (its orientation or heading, etc.).

The mapping and localization stack 714 can determine the AV's position and orientation (pose) using different methods from multiple systems (e.g., GPS, IMUs, cameras, LIDAR, RADAR, ultrasonic sensors, the HD geospatial database 726, etc.). For example, in some cases, the AV 702 can compare sensor data captured in real-time by the sensor systems 704-708 to data in the HD geospatial database 726 to determine its precise (e.g., accurate to the order of a few centimeters or less) position and orientation. The AV 702 can focus its search based on sensor data from one or more first sensor systems (e.g., GPS) by matching sensor data from one or more second sensor systems (e.g., LIDAR). If the mapping and localization information from one system is unavailable, the AV 702 can use mapping and localization information from a redundant system and/or from remote data sources.

The prediction stack 716 can receive information from the localization stack 714 and objects identified by the perception stack 712 and predict a future path for the objects. In some examples, the prediction stack 716 can output several likely paths that an object is predicted to take along with a probability associated with each path. For each predicted path, the prediction stack 716 can also output a range of points along the path corresponding to a predicted location of the object along the path at future time intervals along with an expected error value for each of the points that indicates a probabilistic deviation from that point.

The planning stack 718 can determine how to maneuver or operate the AV 702 safely and efficiently in its environment. For example, the planning stack 718 can receive the location, speed, and direction of the AV 702, geospatial data, data regarding objects sharing the road with the AV 702 (e.g., pedestrians, bicycles, vehicles, ambulances, buses, cable cars, trains, traffic lights, lanes, road markings, etc.) or certain events occurring during a trip (e.g., emergency vehicle blaring a siren, intersections, occluded areas, street closures for construction or street repairs, double-parked cars, etc.), traffic rules and other safety standards or practices for the road, user input, and other relevant data for directing the AV 702 from one point to another and outputs from the perception stack 712, localization stack 714, and prediction stack 716. The planning stack 718 can determine multiple sets of one or more mechanical operations that the AV 702 can perform (e.g., go straight at a specified rate of acceleration, including maintaining the same speed or decelerating; turn on the left blinker, decelerate if the AV is above a threshold range for turning, and turn left; turn on the right blinker, accelerate if the AV is stopped or below the threshold range for turning, and turn right; decelerate until completely stopped and reverse; etc.), and select the best one to meet changing road conditions and events. If something unexpected happens, the planning stack 718 can select from multiple backup plans to carry out. For example, while preparing to change lanes to turn right at an intersection, another vehicle may aggressively cut into the destination lane, making the lane change unsafe. The planning stack 718 could have already determined an alternative plan for such an event. Upon its occurrence, it could help direct the AV 702 to go around the block instead of blocking a current lane while waiting for an opening to change lanes.

The control stack 722 can manage the operation of the vehicle propulsion system 730, the braking system 732, the steering system 734, the safety system 736, and the cabin system 738. The control stack 722 can receive sensor signals from the sensor systems 704-708 as well as communicate with other stacks or components of the local computing device 710 or a remote system (e.g., the data center 750) to effectuate operation of the AV 702. For example, the control stack 722 can implement the final path or actions from the multiple paths or actions provided by the planning stack 718. This can involve turning the routes and decisions from the planning stack 718 into commands for the actuators that control the AV's steering, throttle, brake, and drive unit.

The communications stack 720 can transmit and receive signals between the various stacks and other components of the AV 702 and between the AV 702, the data center 750, the client computing device 770, and other remote systems. The communications stack 720 can enable the local computing device 710 to exchange information remotely over a network, such as through an antenna array or interface that can provide a metropolitan WIFI network connection, a mobile or cellular network connection (e.g., Third Generation (3G), Fourth Generation (4G), Long-Term Evolution (LTE), 5th Generation (5G), etc.), and/or other wireless network connection (e.g., License Assisted Access (LAA), Citizens Broadband Radio Service (CBRS), MULTEFIRE, etc.). The communications stack 720 can also facilitate the local exchange of information, such as through a wired connection (e.g., a user's mobile computing device docked in an in-car docking station or connected via Universal Serial Bus (USB), etc.) or a local wireless connection (e.g., Wireless Local Area Network (WLAN), Bluetooth®, infrared, etc.).

The HD geospatial database 726 can store HD maps and related data of the streets upon which the AV 702 travels. In some examples, the HD maps and related data can include multiple layers, such as an areas layer, a lanes and boundaries layer, an intersections layer, a traffic controls layer, and so forth. The areas layer can include geospatial information indicating geographic areas that are drivable (e.g., roads, parking areas, shoulders, etc.) or not drivable (e.g., medians, sidewalks, buildings, etc.), drivable areas that constitute links or connections (e.g., drivable areas that form the same road) versus intersections (e.g., drivable areas where two or more roads intersect), and so on. The lanes and boundaries layer can include geospatial information of road lanes (e.g., lane centerline, lane boundaries, type of lane boundaries, etc.) and related attributes (e.g., direction of travel, speed limit, lane type, etc.). The lanes and boundaries layer can also include three-dimensional (3D) attributes related to lanes (e.g., slope, elevation, curvature, etc.). The intersections layer can include geospatial information of intersections (e.g., crosswalks, stop lines, turning lane centerlines and/or boundaries, etc.) and related attributes (e.g., permissive, protected/permissive, or protected only left turn lanes; legal or illegal u-turn lanes; permissive or protected only right turn lanes; etc.). The traffic controls lane can include geospatial information of traffic signal lights, traffic signs, and other road objects and related attributes.

The AV operational database 724 can store raw AV data generated by the sensor systems 704-708, stacks 712-722, and other components of the AV 702 and/or data received by the AV 702 from remote systems (e.g., the data center 750, the client computing device 770, etc.). In some examples, the raw AV data can include HD LIDAR point cloud data, image data, RADAR data, GPS data, and other sensor data that the data center 750 can use for creating or updating AV geospatial data or for creating simulations of situations encountered by AV 702 for future testing or training of various machine learning algorithms that are incorporated in the local computing device 710.

The data center 750 can include a private cloud (e.g., an enterprise network, a co-location provider network, etc.), a public cloud (e.g., an Infrastructure as a Service (IaaS) network, a Platform as a Service (PaaS) network, a Software as a Service (SaaS) network, or other Cloud Service Provider (CSP) network), a hybrid cloud, a multi-cloud, and/or any other network. The data center 750 can include one or more computing devices remote to the local computing device 710 for managing a fleet of AVs and AV-related services. For example, in addition to managing the AV 702, the data center 750 may also support a ridesharing and/or ridehailing service, a delivery service, a remote/roadside assistance service, street services (e.g., street mapping, street patrol, street cleaning, street metering, parking reservation, etc.), and the like.

The data center 750 can send and receive various signals to and from the AV 702 and the client computing device 770. These signals can include sensor data captured by the sensor systems 704-708, roadside assistance requests, software updates, ridesharing and/or ridehailing pick-up and drop-off instructions, and so forth. In this example, the data center 750 includes a data management platform 752, an Artificial Intelligence/Machine Learning (AI/ML) platform 754, a simulation platform 756, a remote assistance platform 758, and a ridehailing platform 760, and a map management platform 762, among other systems.

The data management platform 752 can be a "big data" system capable of receiving and transmitting data at high velocities (e.g., near real-time or real-time), processing a large variety of data and storing large volumes of data (e.g., terabytes, petabytes, or more of data). The varieties of data can include data having different structures (e.g., structured, semi-structured, unstructured, etc.), data of different types (e.g., sensor data, mechanical system data, ridesharing and/or ridehailing service, map data, audio, video, etc.), data associated with different types of data stores (e.g., relational databases, key-value stores, document databases, graph databases, column-family databases, data analytic stores, search engine databases, time series databases, object stores, file systems, etc.), data originating from different sources (e.g., AVs, enterprise systems, social networks, etc.), data having different rates of change (e.g., batch, streaming, etc.), and/or data having other characteristics. The various platforms and systems of the data center 750 can access data stored by the data management platform 752 to provide their respective services.

The AI/ML platform 754 can provide the infrastructure for training and evaluating machine learning algorithms for operating the AV 702, the simulation platform 756, the remote assistance platform 758, the ridehailing platform 760, the map management platform 762, and other platforms and systems. Using the AI/ML platform 754, data scientists can prepare data sets from the data management platform 752; select, design, and train machine learning models; evaluate, refine, and deploy the models; maintain, monitor, and retrain the models; and so on.

The simulation platform 756 can enable testing and validation of the algorithms, machine learning models, neural networks, and other development efforts for the AV 702, the remote assistance platform 758, the ridehailing platform 760, the map management platform 762, and other platforms and systems. The simulation platform 756 can replicate a variety of driving environments and/or reproduce real-world scenarios from data captured by the AV 702, including rendering geospatial information and road infrastructure (e.g., streets, lanes, crosswalks, traffic lights, stop signs, etc.) obtained from the map management platform 762 and/or a cartography platform; modeling the behavior of other vehicles, bicycles, pedestrians, and other dynamic elements; simulating inclement weather conditions, different traffic scenarios; and so on.

The remote assistance platform 758 can generate and transmit instructions regarding the operation of the AV 702. For example, in response to an output of the AI/ML platform 754 or other system of the data center 750, the remote assistance platform 758 can prepare instructions for one or more stacks or other components of the AV 702.

The ridehailing platform 760 can interact with a customer of a ridesharing/ridehailing service via a ridehailing application 772 executing on the client computing device 770. The client computing device 770 can be any type of computing system such as, for example and without limitation, a server, desktop computer, laptop computer, tablet computer, smartphone, smart wearable device (e.g., smartwatch, smart eyeglasses or other Head-Mounted Display (HMD), smart ear pods, or other smart in-ear, on-ear, or over-ear device, etc.), gaming system, or any other computing device for accessing the ridehailing application 772. In some cases, the client computing device 770 can be a customer's mobile computing device or a computing device integrated with the AV 702 (e.g., the local computing device 710). The ridehailing platform 760 can receive requests to pick up or drop off from the ridehailing application 772 and dispatch the AV 702 for the trip.

Map management platform 762 can provide a set of tools for the manipulation and management of geographic and spatial (geospatial) and related attribute data. The data management platform 752 can receive LIDAR point cloud data, image data (e.g., still image, video, etc.), RADAR data, GPS data, and other sensor data (e.g., raw data) from one or more AVs 702, Unmanned Aerial Vehicles (UAVs), satellites, third-party mapping services, and other sources of geospatially referenced data. The raw data can be processed, and map management platform 762 can render base representations (e.g., tiles (2D), bounding volumes (3D), etc.) of the AV geospatial data to enable users to view, query, label, edit, and otherwise interact with the data. Map management platform 762 can manage workflows and tasks for operating on the AV geospatial data. Map management platform 762 can control access to the AV geospatial data, including granting or limiting access to the AV geospatial data based on user-based, role-based, group-based, task-based, and other attribute-based access control mechanisms. Map management platform 762 can provide version control for the AV geospatial data, such as to track specific changes that (human or machine) map editors have made to the data and to revert changes when necessary. Map management platform 762 can administer release management of the AV geospatial data, including distributing suitable iterations of the data to different users, computing devices, AVs, and other consumers of HD maps. Map management platform 762 can provide analytics regarding the AV geospatial data and related data, such as to generate insights relating to the throughput and quality of mapping tasks.

In some examples, the map viewing services of map management platform 762 can be modularized and deployed as part of one or more of the platforms and systems of the data center 750. For example, the AI/ML platform 754 may incorporate the map viewing services for visualizing the effectiveness of various object detection or object classification models, the simulation platform 756 may incorporate the map viewing services for recreating and visualizing certain driving scenarios, the remote assistance platform 758 may incorporate the map viewing services for replaying traffic incidents to facilitate and coordinate aid, the ridehailing platform 760 may incorporate the map viewing services into the ridehailing application 772 to enable passengers to view the AV 702 in transit to a pick-up or drop-off location, and so on.

While the AV 702, the local computing device 710, and the autonomous vehicle environment 700 are shown to include certain systems and components, one of ordinary skill will appreciate that the AV 702, the local computing device 710, and/or the autonomous vehicle environment 700 can include more or fewer systems and/or components than those shown in FIG. 7. For example, the AV 702 can include other services than those shown in FIG. 7 and the local computing device 710 can, in some instances, include one or more memory devices (e.g., RAM, ROM, cache, and/or the like), one or more network interfaces (e.g., wired and/or wireless communications interfaces and the like), and/or other hardware or processing devices that are not shown in FIG. 7. An illustrative example of a computing device and hardware components that can be implemented with the local computing device 710 is described above with respect to FIG. 6.

Examples and aspects within the scope of the present disclosure may also include tangible and/or non-transitory computer-readable storage media or devices for carrying or having computer-executable instructions or data structures stored thereon. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general-purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform tasks or implement abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other examples and aspects of the disclosure may be practiced in network computing environments with many types of computer system configurations, including personal computers, hand-held devices, multi-processor systems, microprocessor-based or programmable consumer electronics, network Personal Computers (PCs), minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

Claim language or other language in the disclosure reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

The various embodiments described above are provided by way of illustration only and should not be construed to limit the scope of the disclosure. For example, the principles herein apply equally to optimization as well as general improvements. Various modifications and changes may be made to the principles described herein without following the example embodiments and applications illustrated and described herein, and without departing from the spirit and scope of the disclosure.

Illustrative examples of the disclosure include:

Aspect 1. An autonomous vehicle inspection system comprising: a controller; a robotic arm in communication with the controller; and a modular hub coupled to an end of the robotic arm, the modular hub having a plurality of ports for receiving a plurality of peripherals, wherein each port of the plurality of ports is addressable, and wherein each peripheral connected to the plurality of ports is individually identified and controlled by the controller, wherein the controller determines the XYZ location of each connected peripheral based on an identity of each peripheral and the address of the corresponding port associated with each peripheral.

Aspect 2. The autonomous vehicle inspection system of Aspect 1, wherein the modular hub further comprises a plurality of cameras, each camera having a different field of view, and wherein image data provided by the plurality of cameras is processed by the controller to confirm a location of connected peripherals with respect to the autonomous vehicle.

Aspect 3. The autonomous vehicle inspection system of any of Aspects 1 or 2, wherein the modular hub further comprises inertial measurement unit (IMU), wherein data provided by the IMU is processed by the controller to confirm a location of connected peripherals with respect to the autonomous vehicle.

Aspect 4. The autonomous vehicle inspection system of any of Aspects 1 to 3, wherein each port of the plurality of ports are configured to provide power to and communicate with connected peripherals.

Aspect 5. The autonomous vehicle inspection system of any of Aspects 1 to 4, wherein the plurality of peripherals comprises a camera, an electronic nose, and a probe for receiving diagnostic information from the autonomous vehicle.

Aspect 6. The autonomous vehicle inspection system of any of Aspects 1 to 5, wherein the controller is further configured to communicate with a remote data center, wherein data received from the remote data center relates to threshold criteria used to determine whether the autonomous vehicle passes inspection.

Aspect 7. The autonomous vehicle inspection system of any of Aspects 1 to 6, wherein the controller is further configured to communicate with the autonomous vehicle, wherein data received from the autonomous vehicle relates to an operating condition of components of the autonomous vehicle.

Aspect 8. The autonomous vehicle inspection system of any of Aspects 1 to 7, wherein the controller is further configured to generate a recommendation for identifying which port of the plurality of ports to connect a peripheral.

Aspect 9. The autonomous vehicle inspection system of any of Aspects 1 to 8, wherein the controller is further configured to detect a human in proximity to the robotic arm, modular hub, and connected peripherals.

Aspect 10. The autonomous vehicle inspection system of any of Aspects 1 to 9, wherein the controller is further configured to alter operation of a connected peripheral based on an environmental condition of the autonomous vehicle.

Aspect 11. The autonomous vehicle inspection system of any of Aspects 1 to 10, further comprising a set of modular hubs coupled to the robotic arm, the set of modular hubs comprising the modular hub and one or more additional modular hubs, wherein each of the one or more additional modular hubs comprises one or more ports for receiving one or more peripherals.

Aspect 12. The autonomous vehicle inspection system of Aspect 11, wherein each modular hub is configured to report a state of health of that modular hub to at least one of the controller and one or more processors.

Aspect 13. The autonomous vehicle inspection system of any of Aspects 11 or 12, wherein the controller is configured to: detect at least one of an error and a failure of a particular modular hub from the set of modular hubs; and in response to detecting the at least one of the error and the failure, generating a routing recommendation identifying at least one additional modular hub from the set of modular hub that an autonomous vehicle can use to perform or complete an inspection of the autonomous vehicle.

Aspect 14. The autonomous vehicle inspection system of any of Aspects 11 to 13, wherein the controller is configured to: determine that an inspection capability from a set of inspection capabilities needed to perform a particular inspection of an autonomous vehicle is not supported by the modular hub; based on the inspection capability not being supported by the modular hub, identify at least one modular hub from the set of modular hubs that supports the inspection capability; and generate a recommendation that routes the autonomous vehicle to the at least one modular hub for a portion of the particular inspection involving the inspection capability, the recommendation indicating that the at least one modular hub supports the inspection capability.

Aspect 15. A computer-implemented method for inspecting an autonomous vehicle, the method comprising: receiving an identifier and XYZ data from a first peripheral connected to a first port of a modular hub, wherein the modular hub is coupled to an end of a robotic arm; receiving an identifier and XYZ data from a second peripheral connected to a second port of a modular hub; calculating a first XYZ position of the first peripheral with respect to a base of the robotic arm based on the location of the first port and the XYZ data from the first peripheral; calculating a second XYZ position of the second peripheral with respect to the base of the robotic arm based on the location of the second port and the XYZ data from the second peripheral; moving the first peripheral into proximity with an autonomous vehicle using the first XYZ position; inspecting the autonomous vehicle by controlling the first peripheral via a controller; moving the second peripheral into proximity with the autonomous vehicle using the second XYZ position; and inspecting the autonomous vehicle by controlling the second peripheral via the controller.

Aspect 16. The computer-implemented method of Aspect 15, further comprising: receiving image data from a plurality of cameras mounted to the modular hub; and confirming a location of the first and second peripherals using the image data.

Aspect 17. The computer-implemented method of any of Aspects 15 or 16, further comprising: communicating with a remote data center; receiving threshold criteria from the remote data center relating to inspection requirements; and comparing data received from the first or second peripherals to the threshold criteria to determine whether the autonomous vehicle passes inspection.

Aspect 18. The computer-implemented method of any of Aspects 15 to 17, further comprising: communicating with the autonomous vehicle; receiving diagnostic data from the autonomous vehicle; and generating instructions to control the first or second peripheral based on the received diagnostic data.

Aspect 19. The computer-implemented method of any of Aspects 15 to 18, further comprising: receiving environmental data relating to an environmental condition of the autonomous vehicle; and generating instructions to control the first or second peripheral based on the received environmental data.

Aspect 20. The computer-implemented method of any of Aspects 15 to 19, wherein the first port and the second port are configured to provide power to and communicate with the first and second peripherals, respectively.

Aspect 21. The computer-implemented method of any of Aspects 15 to 20, wherein the first peripheral comprises at least one of a camera, an electronic nose, a proximity sensor, a tire tread scanner, and a probe for connecting to on-board diagnostic ports.

Aspect 22. The computer-implemented method of any of Aspects 15 to 21, wherein the second peripheral comprises at least one of a vacuum, a brush, and a cleaning head.

Aspect 23. The computer-implemented method of any of Aspects 15 to 22, wherein the robotic arm is coupled to a set of modular hubs, the set of modular hubs comprising the modular hub and one or more additional modular hubs, wherein each of the one or more additional modular hubs comprises one or more ports for receiving one or more peripherals.

Aspect 24. The computer-implemented method of Aspect 23, wherein each modular hub is configured to report a state of health of that modular hub to at least one of the controller and one or more processors.

Aspect 25. The computer-implemented method of any of Aspects 23 to 24, wherein the controller is configured to: detect at least one of an error and a failure of a particular modular hub from the set of modular hubs; and in response to detecting the at least one of the error and the failure, generating a routing recommendation identifying at least one additional modular hub from the set of modular hub that an autonomous vehicle can use to perform or complete an inspection of the autonomous vehicle.

Aspect 26. The computer-implemented method of any of Aspects 23 to 25, wherein the controller is configured to: determine that an inspection capability from a set of inspection capabilities needed to perform a particular inspection of an autonomous vehicle is not supported by the modular hub; based on the inspection capability not being supported by the modular hub, identify at least one modular hub from the set of modular hubs that supports the inspection capability; and generate a recommendation that routes the autonomous vehicle to the at least one modular hub for a portion of the particular inspection involving the inspection capability, the recommendation indicating that the at least one modular hub supports the inspection capability.

Aspect 27. A non-transitory computer-readable storage medium comprising at least one instruction for causing a computer or processor to: receive an identifier and XYZ data from a first peripheral connected to a first port of a modular hub, wherein the modular hub is coupled to an end of a robotic arm; receive an identifier and XYZ data from a second peripheral connected to a second port of a modular hub; calculate a first XYZ position of the first peripheral with respect to a base of the robotic arm based on the location of the first port and the XYZ data from the first peripheral; calculate a second XYZ position of the second peripheral with respect to the base of the robotic arm based on the location of the second port and the XYZ data from the second peripheral; move the first peripheral into proximity with an autonomous vehicle using the first XYZ position; inspect the autonomous vehicle by controlling the first peripheral via a controller; move the second peripheral into proximity with the autonomous vehicle using the second XYZ position; and inspect the autonomous vehicle by controlling the second peripheral via the controller.

Aspect 20. The non-transitory computer-readable storage medium of Aspect 19, wherein the instructions are further configured to cause the computer or processor to: communicate with a remote data center; receive threshold criteria from the remote data center relating to inspection requirements; and compare data received from the first or second peripherals to the threshold criteria to determine whether the autonomous vehicle passes inspection.

Aspect 29. A non-transitory computer-readable storage medium having stored thereon instructions which, when executed by one or more processors, cause the one or more processors to perform a method according to any of Aspects 15 to 26.

Aspect 30. A system comprising means for performing a method according to any of Aspects 15 to 26.

Aspect 31. A computer-program product comprising instructions which, when executed by one or more processors, cause the one or more processors to perform a method according to any of Aspects 15 to 26.

What is claimed is:

1. An autonomous vehicle inspection system comprising:
a controller;
a robotic arm in communication with the controller; and
a modular hub coupled to an end of the robotic arm, the modular hub having a plurality of ports for receiving a plurality of peripherals, wherein each port of the plurality of ports is addressable, and wherein each peripheral connected to the plurality of ports is individually identified and controlled by the controller,
wherein the controller determines the XYZ location of each connected peripheral based on an identity of each peripheral and the address of the corresponding port associated with each peripheral, and wherein the controller is further configured to communicate with an autonomous vehicle, and wherein data received from the autonomous vehicle relates to an operating condition of one or more components of the autonomous vehicle.

2. The autonomous vehicle inspection system of claim 1, wherein the modular hub further comprises a plurality of cameras, each camera having a different field of view, and wherein the controller is configured to confirm a location of connected peripherals with respect to the autonomous vehicle based on image data captured by the plurality of cameras.

3. The autonomous vehicle inspection system of claim 1, wherein the modular hub further comprises an inertial measurement unit (IMU), wherein the controller is configured to confirm a location of connected peripherals with respect to the autonomous vehicle based on data received from the IMU.

4. The autonomous vehicle inspection system of claim 1, wherein each port of the plurality of ports is configured to provide power to and communicate with one or more connected peripherals.

5. The autonomous vehicle inspection system of claim 1, wherein the plurality of peripherals comprises a camera, an electronic nose, a tire tread scanner, and a probe for receiving diagnostic information from the autonomous vehicle.

6. The autonomous vehicle inspection system of claim 1, wherein the controller is further configured to communicate with a remote data center, wherein data received from the remote data center relates to threshold criteria used to determine whether the autonomous vehicle passes inspection.

7. The autonomous vehicle inspection system of claim 1, wherein the controller is further configured to at least one of generate a recommendation for identifying which port of the plurality of ports to connect a peripheral and alter operation of a connected peripheral based on an environmental condition of the autonomous vehicle.

8. The autonomous vehicle inspection system of claim 1, wherein the controller is further configured to detect a human in proximity to the robotic arm, modular hub, and connected peripherals.

9. The autonomous vehicle inspection system of claim 1, further comprising a set of modular hubs coupled to the robotic arm, the set of modular hubs comprising the modular hub and one or more additional modular hubs, wherein each of the one or more additional modular hubs comprises one or more ports for receiving one or more peripherals, and wherein each modular hub is configured to report a state of health of that modular hub to at least one of the controller and one or more processors.

10. The autonomous vehicle inspection system of claim 9, wherein the controller is configured to:
detect at least one of an error and a failure of a particular modular hub from the set of modular hubs; and
in response to detecting the at least one of the error and the failure, generating a routing recommendation identifying at least one additional modular hub from the set of modular hubs that the autonomous vehicle can use to perform or complete an inspection of the autonomous vehicle.

11. The autonomous vehicle inspection system of claim 9, wherein the controller is configured to:
determine that an inspection capability from a set of inspection capabilities needed to perform a particular inspection of the autonomous vehicle is not supported by the modular hub;
based on the inspection capability not being supported by the modular hub, identify at least one modular hub from the set of modular hubs that supports the inspection capability; and
generate a recommendation that routes the autonomous vehicle to the at least one modular hub for a portion of the particular inspection involving the inspection capability, the recommendation indicating that the at least one modular hub supports the inspection capability.

12. A computer-implemented method for inspecting an autonomous vehicle, the method comprising:
receiving an identifier and XYZ data from a first peripheral connected to a first port of a modular hub, wherein the modular hub is coupled to an end of a robotic arm;
receiving an identifier and XYZ data from a second peripheral connected to a second port of the modular hub;
calculating a first XYZ position of the first peripheral with respect to a base of the robotic arm based on the location of the first port and the XYZ data from the first peripheral;
calculating a second XYZ position of the second peripheral with respect to the base of the robotic arm based on the location of the second port and the XYZ data from the second peripheral;
moving at least one of the first peripheral and the second peripheral into proximity with an autonomous vehicle using at least one of the first XYZ position and the second XYZ position;
inspecting the autonomous vehicle by controlling the first peripheral via a controller; and
inspecting the autonomous vehicle by controlling the second peripheral via the controller.

13. The computer-implemented method of claim 12, further comprising:
receiving image data from a plurality of cameras mounted to the modular hub; and
confirming a location of at least one of the first peripheral and the second peripheral using the image data.

14. The computer-implemented method of claim 12, further comprising:
receiving threshold criteria from a remote data center relating to inspection requirements; and
determine whether the autonomous vehicle passes inspection based on a comparison of the threshold criteria to data received from at least one of the first peripheral and the second peripheral.

15. The computer-implemented method of claim 12, further comprising:
receiving data from at least one of the autonomous vehicle and a remote computer device, the data comprising at least one of diagnostic data from the autonomous vehicle and environmental data relating to an environmental condition of the autonomous vehicle; and
generating instructions to control at least one of the first peripheral and the second peripheral based on the received diagnostic data.

16. The computer-implemented method of claim 12, wherein the first port and the second port are configured to provide power to and communicate with at least one of the first peripheral and the second peripheral, wherein the first peripheral comprises at least one of a camera, an electronic nose, a proximity sensor, and a probe for connecting to on-board diagnostic ports, and wherein the second peripheral comprises at least one of a vacuum, a brush, a tire tread scanner, and a cleaning head.

17. The computer-implemented method of claim 12, wherein the robotic arm is coupled to a set of modular hubs comprising the modular hub and one or more additional modular hubs, wherein each of the one or more additional modular hubs comprises one or more ports for receiving one or more peripherals, and wherein each modular hub is configured to report a state of health of that modular hub to one or more processing devices.

18. The computer-implemented method of claim 17, further comprising:
   detecting at least one of an error and a failure of a particular modular hub from the set of modular hubs; and
   in response to detecting the at least one of the error and the failure, generating a routing recommendation identifying at least one modular hub from the set of modular hubs that the autonomous vehicle can use to perform or complete an inspection of the autonomous vehicle.

19. A non-transitory computer-readable storage medium comprising at least one instruction for causing a computer or processor to:
   receive an identifier and XYZ data from a first peripheral connected to a first port of a modular hub, wherein the modular hub is coupled to an end of a robotic arm;
   receive an identifier and XYZ data from a second peripheral connected to a second port of a modular hub;
   calculate a first XYZ position of the first peripheral with respect to a base of the robotic arm based on the location of the first port and the XYZ data from the first peripheral;
   calculate a second XYZ position of the second peripheral with respect to the base of the robotic arm based on the location of the second port and the XYZ data from the second peripheral;
   move the first peripheral into proximity with an autonomous vehicle using the first XYZ position;
   inspect the autonomous vehicle by controlling the first peripheral via a controller;
   move the second peripheral into proximity with the autonomous vehicle using the second XYZ position; and
   inspect the autonomous vehicle by controlling the second peripheral via the controller.

* * * * *